(12) United States Patent
Petry et al.

(10) Patent No.: US 7,428,410 B2
(45) Date of Patent: *Sep. 23, 2008

(54) VALUE-ADDED ELECTRONIC MESSAGING SERVICES HAVING WEB-BASED USER ACCESSIBLE MESSAGE CENTER

(75) Inventors: Scott M. Petry, Palo Alto, CA (US); Gordon R. Irlam, Redwood City, CA (US); Brian Maggi, Mt. Prospect, IL (US)

(73) Assignee: Google Inc., Mountain View, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 11/194,431

(22) Filed: Aug. 1, 2005

(65) Prior Publication Data

US 2005/0266832 A1  Dec. 1, 2005

Related U.S. Application Data

(63) Continuation of application No. 10/672,688, filed on Sep. 26, 2003, now Pat. No. 7,236,769, which is a continuation of application No. 09/675,609, filed on Sep. 29, 2000, now Pat. No. 6,650,890.

(51) Int. Cl.
*H04L 12/58* (2006.01)
*H04L 12/66* (2006.01)

(52) U.S. Cl. .................... 455/412.1; 370/352

(58) Field of Classification Search ........... 455/412.2, 455/412.1, 414.1, 413, 3, 461, 466, 503, 455/3.01; 370/202–203, 270, 912–913, 206–207, 370/319, 458, 350–356; 379/93.24, 90.01, 379/93.01

See application file for complete search history.

(56) References Cited

U.S. PATENT DOCUMENTS 4,837,798 A  6/1989  Cohen et al.

(Continued)

FOREIGN PATENT DOCUMENTS

WO    WO 96/35994    11/1996

(Continued)

OTHER PUBLICATIONS http://web.archive.org/web/20000815053401/www.brightmail.com/corporate/overview/, no date listed.

(Continued)

*Primary Examiner*—Naghmeh Mehrpour
(74) *Attorney, Agent, or Firm*—Baker & McKenzie LLP

(57) ABSTRACT

This disclosure provides for a unified, centralized, preprocessing electronic messaging solution that performs value-added tasks to electronic messages on behalf of the ISP or the end user, before these messages are delivered to the destination e-mail server. In some embodiments, the electronic messaging solution provides a stored user profile, associated with a user to whom an e-mail message is addressed, that has detection parameters for processing e-mail message data. In such embodiments, a processor is also provided for processing the e-mail message data to identify suspect e-mail messages according to the detection parameters in the user profile. A web page accessible by the user to set the detection parameters is also disclosed. Furthermore, various methods associated with various embodiments of the electronic messaging solution disclosed herein are also disclosed.

24 Claims, 8 Drawing Sheets

U.S. PATENT DOCUMENTS

| | | | |
|---|---|---|---|
| 5,619,648 | A | 4/1997 | Canale et al. |
| 5,627,764 | A | 5/1997 | Schutzman et al. |
| 5,634,005 | A | 5/1997 | Matsuo |
| 5,742,668 | A | 4/1998 | Pepe et al. |
| 5,771,355 | A | 6/1998 | Kuzma et al. |
| 5,796,948 | A | 8/1998 | Cohen |
| 5,832,208 | A | 11/1998 | Chen et al. |
| 5,844,969 | A | 12/1998 | Goldman et al. |
| 5,889,943 | A | 3/1999 | Ji et al. |
| 5,905,777 | A | 5/1999 | Foladare et al. |
| 5,937,161 | A | 8/1999 | Mulligan et al. |
| 5,937,162 | A | 8/1999 | Funk et al. |
| 5,968,117 | A | 10/1999 | Schuetze |
| 5,987,611 | A | 11/1999 | Freund |
| 5,999,932 | A | 12/1999 | Paul |
| 6,014,429 | A | 1/2000 | LaPorta et al. |
| 6,023,723 | A | 2/2000 | McCormick et al. |
| 6,052,709 | A | 4/2000 | Paul |
| 6,061,718 | A | 5/2000 | Nelson |
| 6,073,165 | A | 6/2000 | Narasimhan et al. |
| 6,075,863 | A | 6/2000 | Krishnan et al. |
| 6,092,194 | A | 7/2000 | Touboul |
| 6,112,227 | A | 8/2000 | Heiner |
| 6,118,856 | A | 9/2000 | Paarsmarkt et al. |
| 6,138,146 | A | 10/2000 | Moon et al. |
| 6,146,026 | A | 11/2000 | Ushiku |
| 6,147,987 | A | 11/2000 | Chau et al. |
| 6,178,331 | B1 | 1/2001 | Homes et al. |
| 6,249,805 | B1 | 6/2001 | Fleming, III |
| 6,249,807 | B1 | 6/2001 | Shaw et al. |
| 6,263,202 | B1 | 7/2001 | Kato et al. |
| 6,301,245 | B1 | 10/2001 | Luzeski et al. |
| 6,317,751 | B1 | 11/2001 | Yeger et al. |
| 6,321,267 | B1 | 11/2001 | Donaldson |
| 6,334,140 | B1 | 12/2001 | Kawamata |
| 6,335,966 | B1 | 1/2002 | Toyoda |
| 6,389,276 | B1 | 5/2002 | Brilla et al. |
| 6,404,762 | B1 | 6/2002 | Luzeski et al. |
| 6,411,684 | B1 | 6/2002 | Cohn et al. |
| 6,434,601 | B1 | 8/2002 | Rollins |
| 6,438,215 | B1 | 8/2002 | Skladman et al. |
| 6,442,589 | B1 | 8/2002 | Takahashi et al. |
| 6,453,327 | B1 | 9/2002 | Nielsen |
| 6,487,586 | B2 | 11/2002 | Ogilvie et al. |
| 6,513,045 | B1 | 1/2003 | Casey et al. |
| 6,574,658 | B1 | 6/2003 | Gabber et al. |
| 6,609,196 | B1 | 8/2003 | Dickinson, III et al. |
| 6,615,258 | B1 | 9/2003 | Barry et al. |
| 6,650,890 | B1 | 11/2003 | Irlam et al. |
| 6,654,787 | B1 | 11/2003 | Aronson et al. |
| 6,691,156 | B1 | 2/2004 | Drummond et al. |
| 6,711,618 | B1 | 3/2004 | Danner et al. |
| 6,779,021 | B1 | 8/2004 | Bates et al. |
| 6,868,498 | B1 | 3/2005 | Katsikas |
| 2001/0032095 | A1 | 10/2001 | Balbach |
| 2002/0059454 | A1 | 5/2002 | Barrett et al. |
| 2004/0058673 | A1* | 3/2004 | Irlam et al. .............. 455/412.1 |

FOREIGN PATENT DOCUMENTS

| | | |
|---|---|---|
| WO | WO 97/12321 | 4/1997 |
| WO | WO 97/27546 | 7/1997 |
| WO | WO 98/37680 A2 | 8/1998 |
| WO | WO 99/06929 | 2/1999 |
| WO | WO 99/65256 | 12/1999 |
| WO | WO 99/67731 | 12/1999 |
| WO | WO 00/42747 | 7/2000 |
| WO | WO 00/49776 A1 | 8/2000 |
| WO | WO 01/46867 | 6/2001 |
| WO | WO02/08938 | 1/2002 |

OTHER PUBLICATIONS http://web.archive.org/web/19990128140052/http://www.chooseyourmail.com/, no date listed.
http://web.archive.org/web/20000815064559/www.commtouch.com/solutions/index.shtml, no date listed.
http://web.archive.org/web/20001205151400/mailcircuit.com/route.htm, no date listed.
http://web.archive.org/web/20000824040241/www.messagelabs.com/about/Overview.htm, no date listed.
http://web.archive.org/web/20000816134259/www.antivirus.com/products/email-groupware.htm, no date listed.
International Search Report, Form PCT/ISA/210 dated Apr. 14, 2004, PCT Application No. PCT/US03/04757.
EMC News Release, "EMC Launches Centera, Ushers in New Era of Content-Addresses Storage," New York, Apr. 29, 2002, www.emc.com/news/press_releases/view.jsp?id=1254.
Supplementary European Search Report, EP 03711094.7 dated Sep. 6, 2005.
European Examination Report, EP 01977347.2 dated Aug. 26, 2005.
"Automated Spam Detection," R. Lonn, Feb. 16, 1999.
CVS.Sourceforge.Net, "Spam Filtering ESMTP Demon", copyright notice dated 2000, publ.at http://cvs.sourceforge.net/viewcvs.py/clocc/clocc/src/donc/sml-p.lisp?rev=1.4.
Bounce Spam Mail, from Albert Yale Software, dated 1997-2000, no month listed.
CSM Internet Mail Scanner, from CSM-USA, Inc., dated 1999, no month listed.
CyberSitter AntiSpam, from CyberSitter.com, distributed by Solid Oak Software, circa 1999-2000, no month listed.
DL MailFilter, from DeadLetter and Leem Han Cheong, dated Nov. 1999.
E-Mail Chompaer, from Lorenzo Pasqualis, dated 1996-97, no month listed.
E-Mail Remover, from Victor Javier, Virtual Network, Inc., Singapore, dated Mar.-Jul. 1998, and 1999.
FlameThrower, from Eagle Research, Inc., dated 2000, no month listed.
Interceptor, from Grok Development Ltd., dated 1999-2000, no month listed.
JOC E-Mail Checker, from JOCSoft and Jose Olice Civit, dated 2000, no month listed.
Lyris MailShield, from Lyris, undated, no date listed.
Quickhead-E, from Danere Software Innovations, dated Mar. 2000.
Spam Attack Pro, circa 1996-97, from softwiz.com, no date listed.
Spam Buster, from Contact Plus Corp., dated 2000, no month listed.
SpamEater, from High Mountain Software, dated 1997-2000, no month listed.
BrightMail, from BrightMail, Inc., dated 1997-2000, no month listed.
Praetor, from Computer Mail Services, Inc., circa 1998-99, no month listed.
"MsgTo.com Stops Spam Email", web page circa Nov. 19, 1999, from www.applesforhealth.com.
"The Species Filter", by Rafe Needleman, ed., dated Aug. 6, 1999, from www.RedHerring.com.
Official Sep. 1999 AUP (Auto Update Program) v5.0 Build 447, Product Update Release, winserver.com.
Supplementary European Search Report, EP 01977347 dated Apr. 7, 2005.
Records/Archives in the News, http://listserv.muohio.edu/scripts/wa.exe?A2=ind990le&L=archives&T=0&F=&S=&P=6980, Jan. 1999, pp. 5-6.
Allegro in the News, Mail.com's Allegro Subsidiary Surpasses 200,000 Corporate Users of its Mailzone Service, http://web.archive.org/web/20040617033735/www.allegro-group.com/news/083199.html, Aug. 31, 1999.
MailZone Managed Messaging, MailWatch the Next Generation of MailZone Email Firewall Service is Released, http://web.archive.org/web/19990504151725/http://www.mailzone.net, 2000.
EPO 07003732.0, Supplemental Search Report dated Jul. 6, 2007.

* cited by examiner

VALUE-ADDED ELECTRONIC MESSAGING SERVICES HAVING WEB-BASED USER ACCESSIBLE MESSAGE CENTER

CROSS-REFERENCE TO RELATED APPLICATION

This application is a Continuation Application of U.S. patent application Ser. No. 10/672,688, filed Sep. 26, 2003, pending, which is a Continuation Application of U.S. patent application Ser. No. 09/675,609, filed Sep. 29, 2000, now U.S. Pat. No. 6,650,890, issued Nov. 18, 2003, both of which are commonly assigned with the present application and incorporated herein by reference for all purposes.

TECHNICAL FIELD

Disclosed embodiments herein relate generally to electronic messaging, and more particularly to value-added electronic messaging services having a web-based user accessible message center.

BACKGROUND

The adoption of e-mail has occurred at an unprecedented pace. Of routine computer users, most now have or soon will have an e-mail address. Many have more than one e-mail address, e.g., one for work and another for home. E-mail offers unparalleled convenience of written communication.

Besides ubiquitous e-mail, another powerful trend is wireless access via a variety of wireless devices, e.g., cell phones, pagers, hand-held computers such as Palm and Windows CE devices, etc. Service-specific e-mail gateways allow an e-mail message to be sent from the Internet to a particular wireless device. In the case of a Sprint PCS phone, for example, an e-mail may be addressed to #@sprintpcs.com, where # represents the telephone number of the phone. Despite this capability, wireless messaging is greatly complicated by the fact that a person may have multiple wireless devices, and that at a given time, the sender has no way of knowing the person's whereabouts or preferred method of message delivery at that time, let alone the address specifics pertaining to each gateway.

For example, the person may be in the office, in which case desktop e-mail would be preferred, on the road staying at a hotel, in which case cell phone e-mail might be preferred, or on the road away from a major metropolitan area, in which case pager e-mail (which has nationwide coverage in the US) might be preferred. This situation, referred to herein as the "multiple e-mail box conundrum," is illustrated in FIG. 1. An intended recipient B of an electronic message may receive electronic messages through one or more wired devices and/ or one or more wireless devices, which may include some or all of the following: an ISP mail account, a free web mail account, a PDA mail account, a cell phone subscription, and a pager subscription. In each instance, e-mail is delivered through a different server or gateway connected to the Internet, i.e., a ISP mail server, a portal mail server, a PDA mail server, a cellular gateway and a paging gateway. A message originator A may, at various times, use some or all the devices mentioned to send an electronic message. In the multiple e-mail box conundrum, the message originator needs to know which e-mail address to use to reach the user. In turn, the recipient must monitor all accounts and devices to keep track of critical information. Furthermore, in the case of a wireless network gateway, the wireless gateway will typically strip off any e-mail attachments, usually without any notification to the user.

Note that, in FIG. 1, wired devices may be stand-alone or LAN-based. In the case of stand-alone devices, connection to the Internet is typically dial-up access through an ISP. In the case of a LAN-based device, a server on the LAN may be connected to the Internet through an ISP or directly to the Internet without the involvement of an ISP.

Neither ISPs nor wireless providers are well-positioned to offer a complete solution to the electronic messaging problem. ISPs are primarily focused on new customer acquisition and often do not have enough users to attract wireless partners. In the case of wireless providers, users are generally unwilling to switch their primary e-mail address. And wireless vendors are generally unable to integrate with existing e-mail services.

With the widespread adoption of e-mail, there has also occurred the proliferation of junk e-mail, or "spam." Currently, of the hundreds of millions of e-mail messages sent each day, about 30% of those messages may be expected to be junk e-mail. FIG. 2 illustrates "spamming" of the user of FIG. 1. Various companies (e.g., Brightmail Inc. of San Francisco, Calif.) have addressed the problem of junk e-mail by providing e-mail filtering software that attempts to identify and discard junk e-mail. Typically, such software resides on a destination e-mail server. Such a solution does not scale well; i.e., installing and maintaining e-mail filtering software on e-mail servers grows increasingly difficult as the number of e-mail servers multiplies.

Because of the resources required to install and maintain an e-mail server, various companies have emerged offering e-mail outsourcing in which the e-mail server is provided by a third party outside the organization. E-mail outsourcing off-loads the responsibility for providing and maintaining e-mail service without necessitating any change in domain or e-mail addresses. E-mail is retrieved from an off-site e-mail server provided and maintained by the e-mail outsourcing company. One example of an e-mail outsourcing company is United Messaging Inc. of Malvern, Pa. Despite such arrangements, the multiple e-mail box conundrum and the junk e-mail problems remain.

Accordingly, a need exists for a scalable, transparent solution to the junk e-mail problem. Also, a need exists for a unified messaging solution, embracing wireless messaging, that addresses the foregoing drawbacks of the prior art.

BRIEF SUMMARY

This disclosure, generally speaking, provides for a unified electronic messaging solution in which individual, configurable user profiles are used to route and deliver electronic messages from various sources, wired and/or wireless, to various destinations, wired and/or wireless, in various formats. Furthermore, various methods associated with various embodiments of the electronic messaging solution disclosed herein are also disclosed.

In an exemplary embodiment, the subject line of an electronic message may be sent to a user's pager, while an abbreviated version of the message is sent to the user's PDA having wireless-connectivity and the full electronic message is sent to the user's work. The unified electronic messaging solution may be deployed by ISPs within the existing Internet infrastructure. More preferably, scalability is greatly enhanced by providing (e.g., as part of a Network Operations Center, or NOC), an intermediate server that precedes a destination server on an electronic message delivery path.

The electronic messaging solution allows provides for performance of a variety of value-added services, such as junk e-mail filtering, recipient-directed message routing, including wireless delivery to any of a variety of wireless devices, rich media services such as attachment preview, etc. In the latter embodiment, the operator of the intermediate server therefore functions as an Electronic Messaging Service Provider (EMSP). Preferably, the intermediate server is inserted into the electronic message delivery path by changing a DNS (Domain Name Server) entry pertaining to the destination e-mail server. As a result, no new hardware or software is required for users or ISPs. Because a single NOC including the intermediate server can serve far-flung geographic regions, scalability is achieved.

The ease of inserting the intermediate server into the electronic message delivery path enables self-enrollment by ISPs (Internet Service Providers) in a cooperative services program (that may involve revenue sharing), enabling effective penetration to second-tier ISPs, which are extremely numerous. In one embodiment, junk e-mail, instead of being deleted without notification, is posted to a user-accessible web site where it is kept for a period of time. A user therefore has an opportunity to verify that the diverted messages are indeed junk e-mail. Through the web site, a user may create a profile governing the forwarding of messages. Preferably, the web site is accessible both from the desktop and from the wireless devices themselves, enabling real-time update of the profile by the user or by agent software.

BRIEF DESCRIPTION OF THE DRAWINGS

The present invention may be further understood from the following description in conjunction with the appended drawings. It is emphasized that various features may not be drawn to scale. In fact, the dimensions of various features may be arbitrarily increased or reduced for clarity of discussion. In addition, it is emphasized that some components may not be illustrated for clarity of discussion. In the drawings.

DETAILED DESCRIPTION

Figure 3:
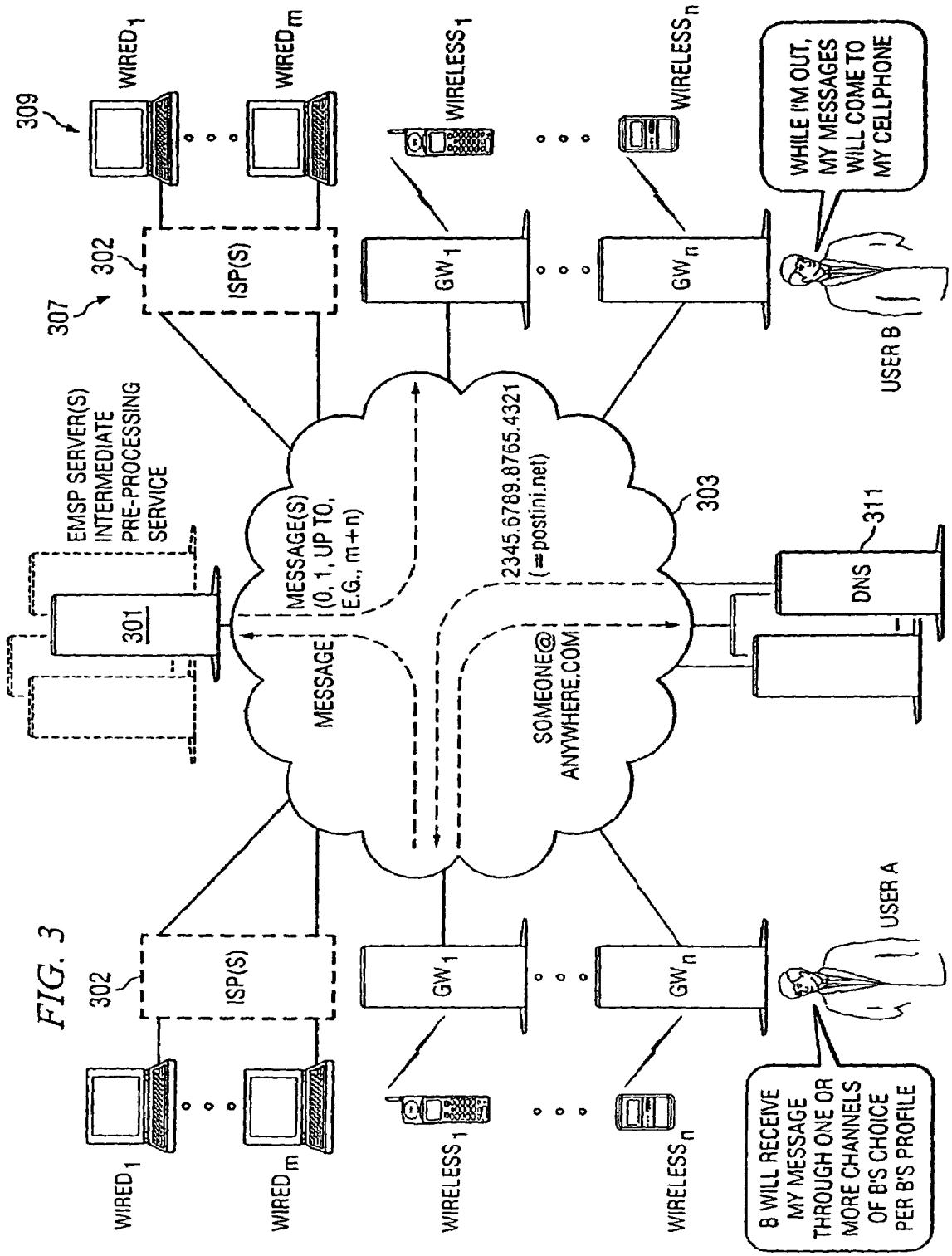
FIG. 3 is a diagram of one embodiment of a unified message delivery system.

Referring now to FIG. 3, a diagram is shown of one embodiment of a unified message delivery system. The system provides for a service that allows the user to define where messages are routed across multiple devices, which portions of messages are routed to which devices, etc. The system allows for ready integration with an end-user's primary e-mail service and is end-user configurable.

Figure 1:
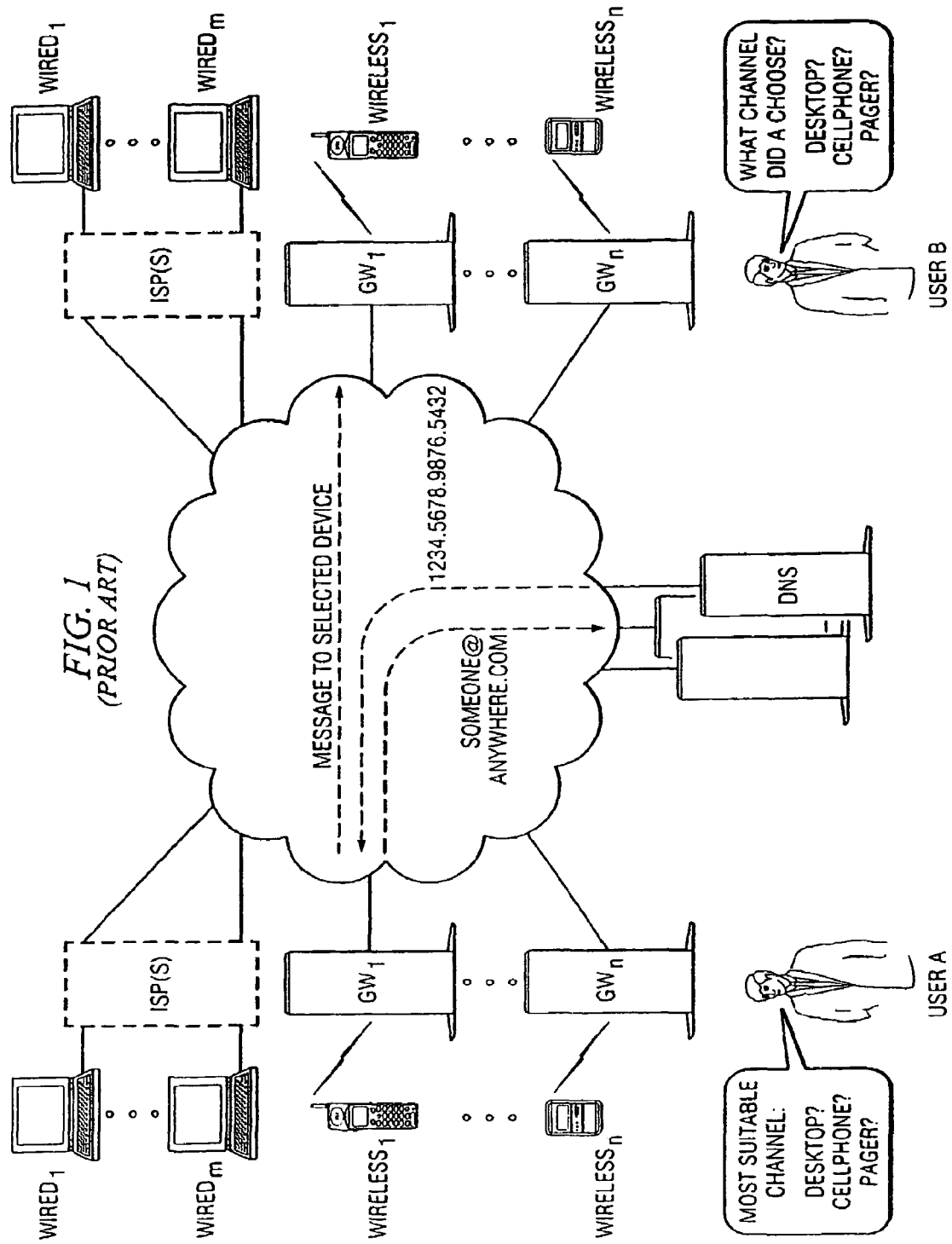
FIG. 1 is a diagram illustrating the multiple e-mail box conundrum.
Figure 2:
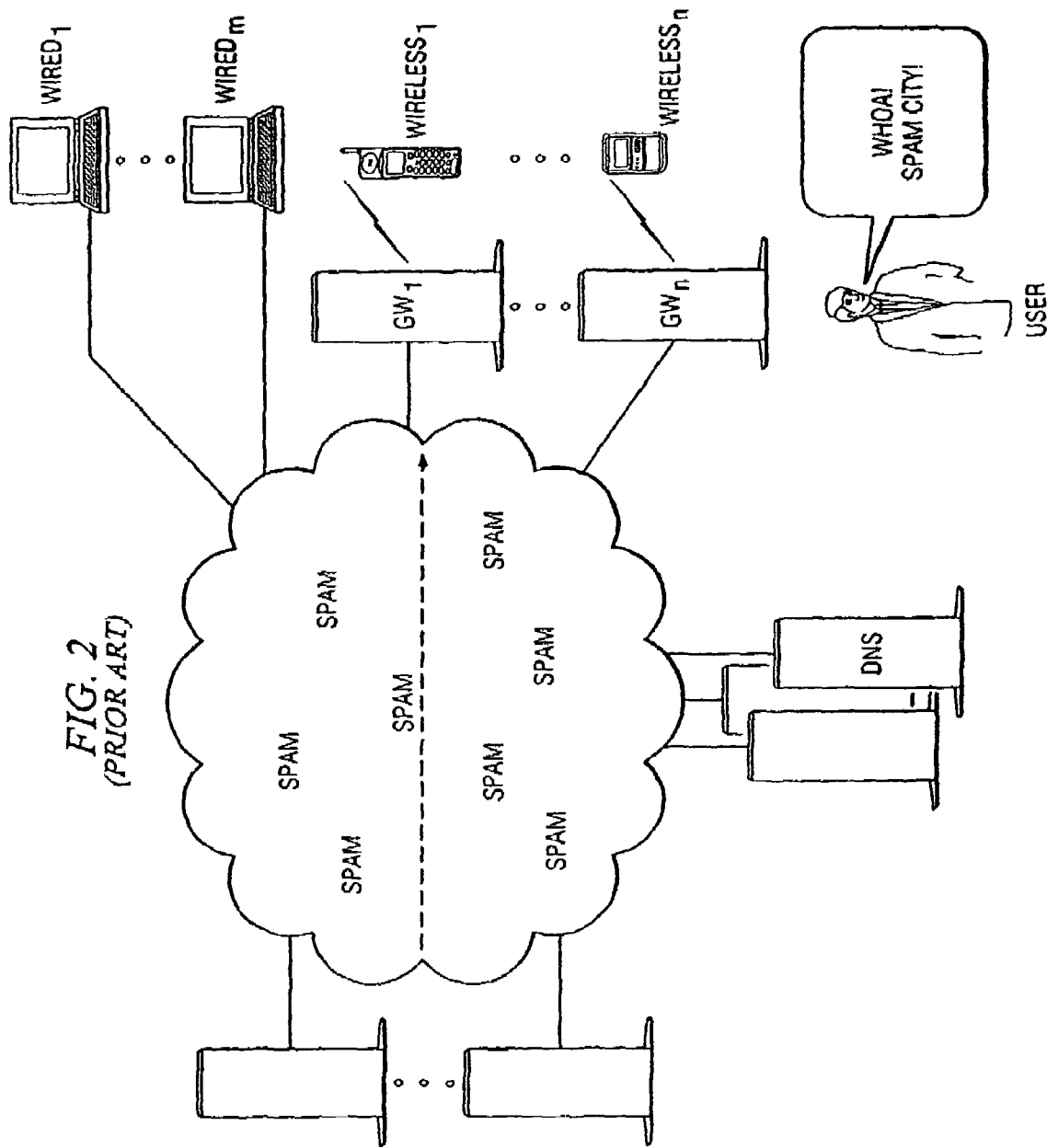
FIG. 2 is a diagram illustrating "spamming" of the user of FIG. 1.

As compared to FIG. 1, in which the electronic message delivery path proceeds through the Internet directly to one of a multiplicity of servers or gateways, in the system of FIG. 3, an intermediate pre-processing service 301 is inserted into the message delivery path. The intermediate pre-processing service 301 preferably comprises an NOC including an array of mail handling machines, a database, a file store, web servers and utility machines. The intermediate pre-processing service 301 is in turn connected to the various servers and gateways of FIG. 1, including, for example, a user's primary ISP 303, if any. Such connection typically also occurs through the Internet (305). The collection of servers and gateways 307 provide e-mail access for a variety of wired and wireless client devices 309, which may include, for example, a main e-mail system (typically a home or office desktop computer), a free web-based mail system (e.g., Yahoo or the like), a PDA (e.g., Palm VII), a cell phone and a pager. A typical user will use two or more of the foregoing electronic message delivery options and some users will use most or all of these options.

By established user-defined preferences, the user is able to control the flow of messages to the various devices. Preferences are configured using web browser software to create or modify a user profile. User profiles are stored in a relational database (not shown) accessible to the intermediate pre-processing service. Note that end-user configuration may occur via any web-enabled device, either wired or wireless. Wireless web access may be supported using technologies presently-known in the art such as Palm's "web clipping" technologies, the UPLink server suite of Phone.com of Redwood City, Calif., Wireless Application Protocol (WAP)-enabled cellphones, etc.

To take a concrete example, there may be three e-mail messages delivered to the intermediate pre-processing service 301 for a particular user, an urgent message, a message from the user's boss, and a message from the user's friend. In this example, the e-mail from the user's friend might be delivered to the user's main e-mail system and to the user's free web mail system. The e-mail from the user's boss might be delivered to the user's PDA. The urgent message might be delivered to the user's cell phone and to the user's pager.

FIG. 3 illustrates the different manner of operation of the message delivery system of FIG. 3, including the intermediate pre-processing service 301, as compared to the conventional electronic message delivery path of FIG. 1. Say, for example, that user A, (e.g., Sue@standford.edu) wishes to send a e-mail to user B (e.g., Tom@aol.com). Sue uses an e-mail program to create, address and send the e-mail. The mail is sent from Sue's computer to the local mail server for Sue's computer, which may reside on Sue's local area network or at an ISP. The local mail server queries a Domain Name Server (DNS) 311 to obtain the IP address for Tom@aol.com. Normally, the local mail server uses the IP address returned by DNS to send the e-mail to the destination e-mail server for Tom's computer, (e.g., mail.aol.com). The e-mail is then delivered to Tom's computer.

In one embodiment of the present system, the normal electronic message delivery path is broken and the intermediate pre-processing service 301 is inserted into the electronic message delivery path. This result is easily accomplished by modifying the appropriate DNS record (such as the MX—mail exchange—record, for example) to point to the intermediate pre-processing service 301 instead of the destination e-mail server (e.g., 303). In this manner, the electronic message delivery path is modified such that the intermediate pre-processing service 301 handles all of the electronic messages that would otherwise have been handled by the destination e-mail server.

Given the ease with which the intermediate pre-processing service may be inserted into the message delivery path, the enrollment of Internet Service Providers (ISPs) in cooperative messaging service agreements with the operator of the intermediate pre-processing service (Electronic Messaging Service Provider, or EMSP) may be automated to a great extent. For example, the ISP may visit the web site of EMSP, indicate assent to terms and conditions, and specify billing information and a service start date.

Prior to the service start date, the ISP advises subscribers and arranges for its DNS entries to be modified appropriately as of the service start date.

Prior to the start date, users are advised by e-mail of additional available message center services. Each user is assigned a user name and password in order to access a message center web site. When the user first visits the message center web site, the user creates a profile that will be used thereafter to select and configure value-added service (e.g., junk e-mail filtering and virus checking) and to control message delivery. Within the profile, the user may designated a particular e-mail server as the user's main e-mail system. Profiles place users in control of their mail experience. Alternatively, a service provider can create a default profile of services and the user can visit the message center web site to modify the default configuration.

When the intermediate pre-processing service 301 receives an e-mail, it look ups the addressee's user profile. The intermediate pre-processing service then performs value-added processing of the message. For example, the intermediate pre-processing service may apply user-selected junk e-mail filters and user-selected virus checkers for checking attachments. Junk-e-mail blocking may be based on both content and IP routing information. "Clean" e-mail is delivered to the user's mail server as normal. Suspect messages, instead of being deleted without notification to the user, is held in a quarantine area, and the user is notified. The user can then, if desired, download messages flagged as suspect by accessing the message center web site.

Alternatively or in addition, the intermediate pre-processing service may deliver to the message to one or more wireless devices in accordance with the user profile, e.g., by forwarding the message to one or more servers or gateways 307 the addresses of which have been specified by the user in the user's profile. Prior to forwarding the message to a server or gateway, the intermediate pre-processing service 301 may perform any necessary reformatting to meet the requirements of a particular recipient device.

In general, a user may configure an arbitrary number of communication "channels," each channel including a destination and, optionally, one or more message modification procedures including filters, reformatters, etc. that may affect message presentation, be required for message transport, etc.

The intermediate pre-processing service 301 may perform myriad other types of services. One example of such services involves certain attachments, e.g., rich media items such as MP3, JPEG, MPEG, etc. Such items are notorious "bandwidth hogs" and can easily clog up the message delivery system. Rather than simply delete such items, however, the intermediate pre-processing service 301 allows such items to be intelligently managed. One option is to treat rich media in like manner as junk e-mail. That is, rich media items, instead of being delivered with the e-mail messages to which they are attached, are delivered to the message center web site, and the user is notified. The user can then view/play or ignore the items as desired.

Another option is to produce replacement attachments, i.e., "thumbnail" versions of the rich media items. An option may be provided for the original full attachment(s) to be delivered to the user with a subsequent system-generated e-mail message. For example, a link may be embedded in the thumbnail along with appropriate text advising the user to click on the link to receive the full attachment. In one embodiment, clicking on the link takes the user to a complete, high resolution image residing in the user's personal message center.

Note that the functionality of the intermediate pre-processing service may be implemented at ISPs rather than at a central NOC without any sacrifice of functionality or any noticeable effect on the end user. In this instance, DNS information remains unchanged. In this scenario, however, ISPs must be persuaded to invest in additional hardware and/or software.

Figure 4:
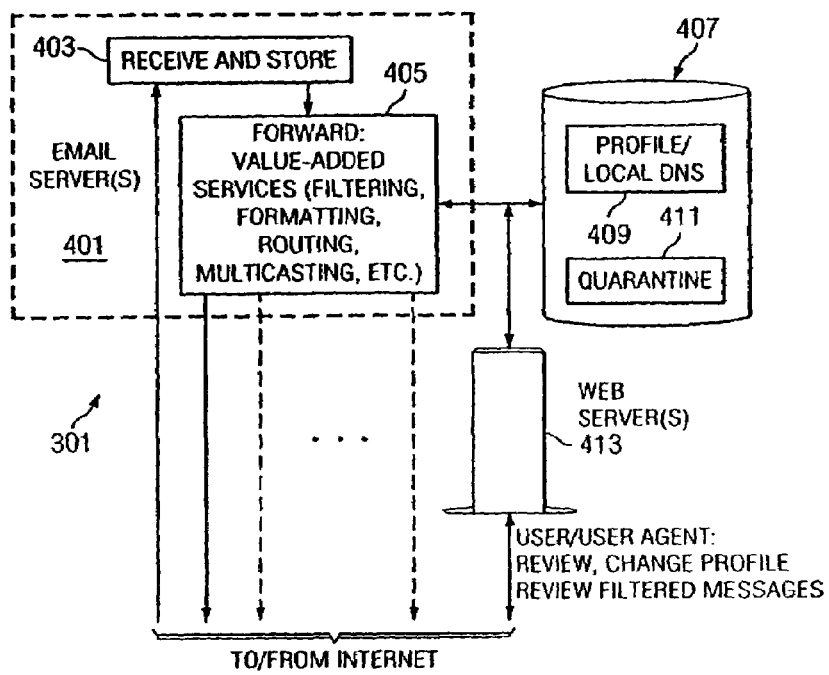
FIG. 4 is a block diagram of one embodiment of the intermediate server(s) of FIG. 3.

Referring to FIG. 4, a generalized block diagram is shown of one embodiment of the intermediate pre-processing service 301 of FIG. 3. One or more messaging servers 401, e.g., e-mail servers, are provided, realizing a receive and store function 403 and a forward function 405. The forward function incorporates various value-added services such as filtering, formatting, routing, multicasting, etc. Due to the multicasting feature of the forward block 405, a single incoming message may result in the forwarding of some greater number of outgoing messages.

The forward block 405 communicates with storage 407, which may include one or more relational databases or file servers. Storage 407 includes profile and local DNS information 409 for each subscriber, as well as a "quarantine" area 411 for storing filtered messages, e.g., messages determined to be unfit to forward. Subscribers are provided access to storage 407 through one or more web servers 413, allowing subscribers to configure their profiles, view filtered messages, etc.

Figure 5A:
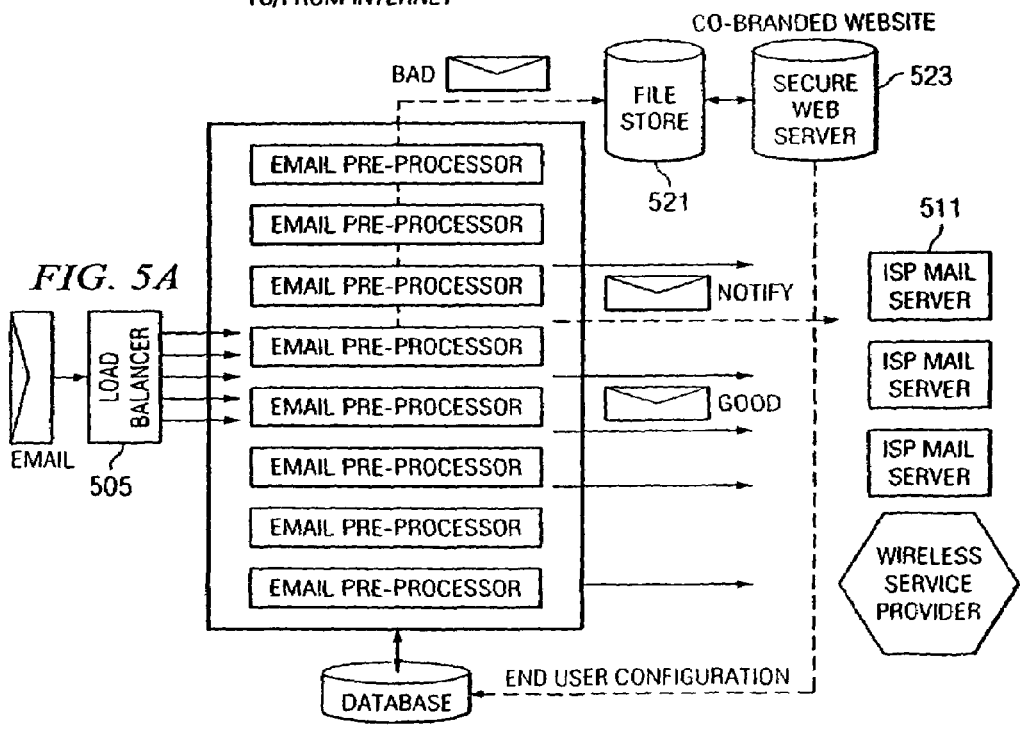
FIG. 5A is a more detailed block diagram of one embodiment of the server of FIG. 4.

Referring to FIG. 5A, a more detailed block diagram is shown of the intermediate pre-processing service 301 in accordance with an exemplary embodiment of the invention. Multiple hosts are defined on both the inbound mail server and the outbound mail server. Each host runs a copy of an appropriate mail program such as FreeBSD Qmail. In one alternate embodiment, a machine or a cluster of machines operates as a mail-receiving machine and a mail-delivering machine. This machine will accept a connection from a sending SMTP server and begin receiving data. Simultaneously, the machine will begin receiving the message data, querying the database for a specific user configuration, processing messages based on configuration, opening a connection to a receiving SMTP server, and delivering it. Standard mail server software is not required for this alternate embodiment.

Incoming mail is routed to an available host by a load balancer 505, or load-sharing switch/router, of a type commonly available from Cisco and other network equipment manufacturers. The server cluster 501 can include a server running a relational database management system such as Oracle, for example. The host queries the database to identify the user and user preferences. The host then processes the message as specified in the user profile. For spam checking, each host runs a copy of an appropriate spam filter. Virus checking can be done using a virus scanning application such as that available from Trend.

Good e-mails are addressed with one or more addresses in accordance with information specified in the user profile and sent to the outbound mail server cluster to be sent out. To deliver a message addressed to user@isp.com, our intermediate preprocessing lookup service looks up user@postini-mail.isp.com and delivers. This allows the ISP to update the final delivery location without requiring the intermediate pre-processing service to make any changes. The e-mail is sent to the ISP mail server 511 and possibly to other servers or gateways in accordance with the user profile.

Bad e-mails are saved "in quarantine" on a message center web site, and a notification e-mail is sent to the user. In the illustrated embodiment, the inbound mail server cluster is connected to a file store 521. The file store is in turn connected to a web server 523. When a user logs on to the web server, a web page is displayed that includes a link for displaying a summary of quarantined messages and/or attachments. By clicking on a selected item, the user is able to view the item and, depending on the attachment type, may be able to view the attachment. If the user so chooses, the user may be allowed to download an item suspected to contain a virus after the user has been given appropriate warning.

Figure 5B:
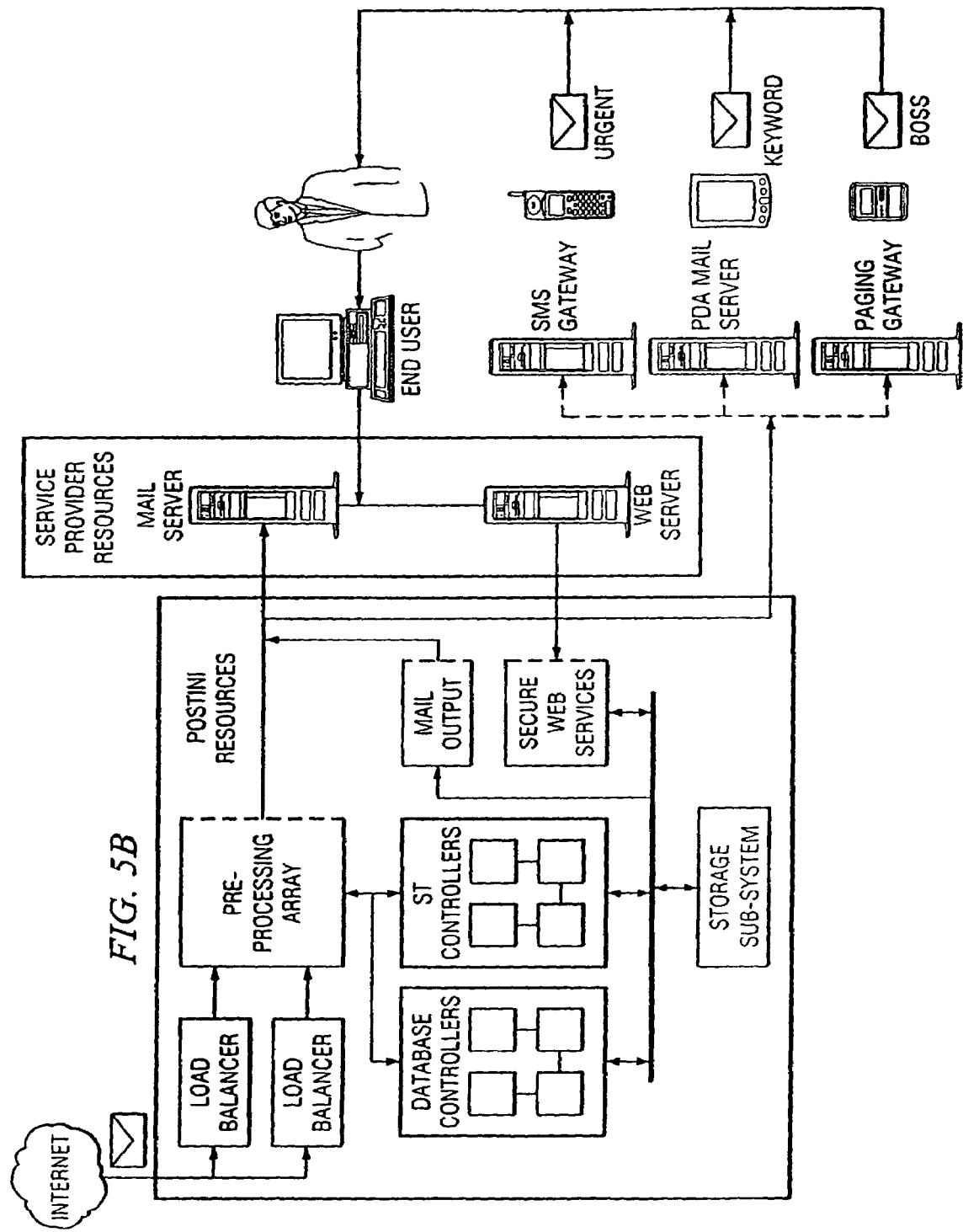
FIG. 5B is an alternate diagram of one embodiment of the server of FIG. 4.

FIG. 5B shows an alternate diagram of a system of the present invention.

Figure 6A:
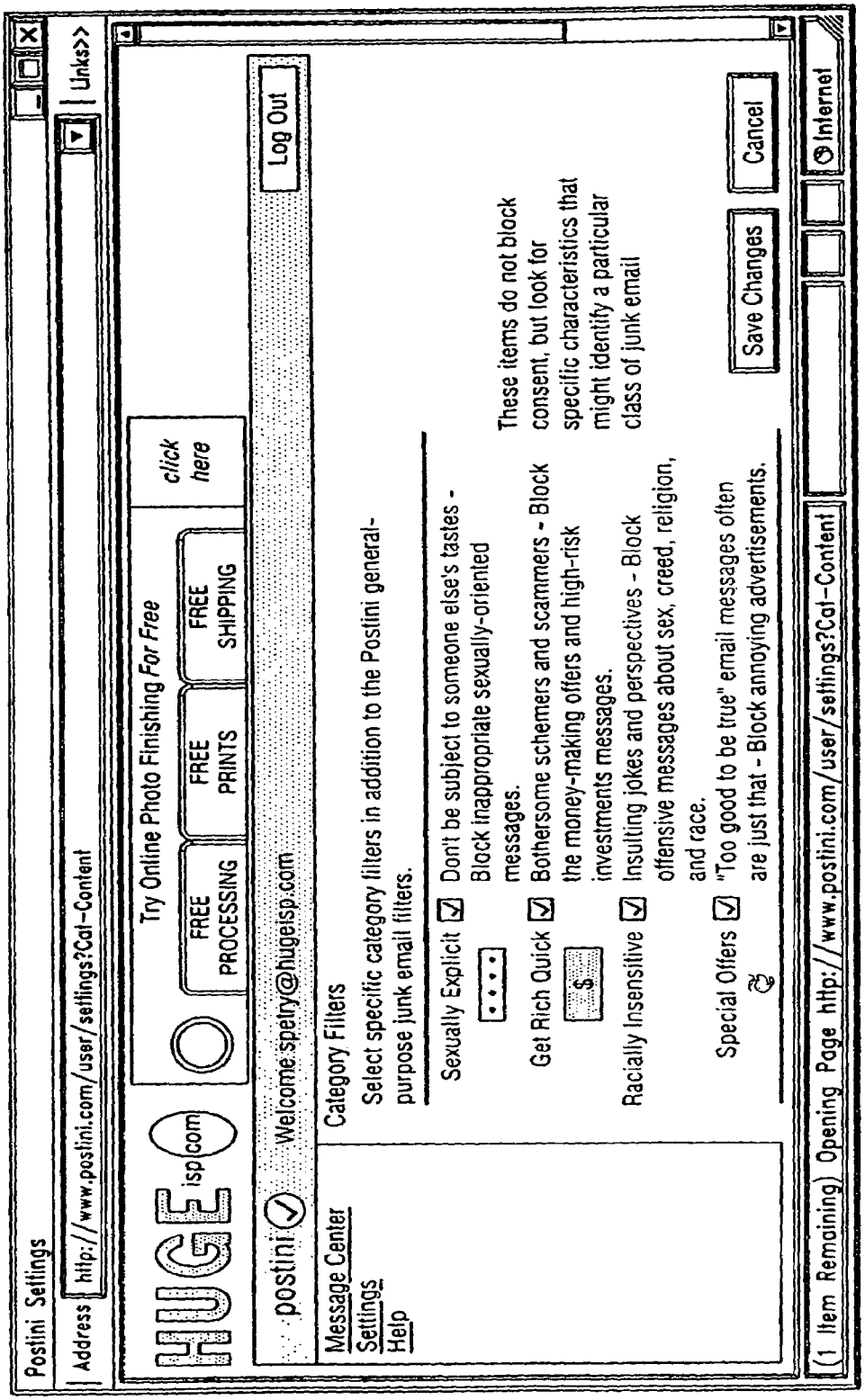
FIG. 6 is a diagram of an exemplary embodiment showing a configuration screen display that may be used to configure the unified message delivery system.
Figure 6B:
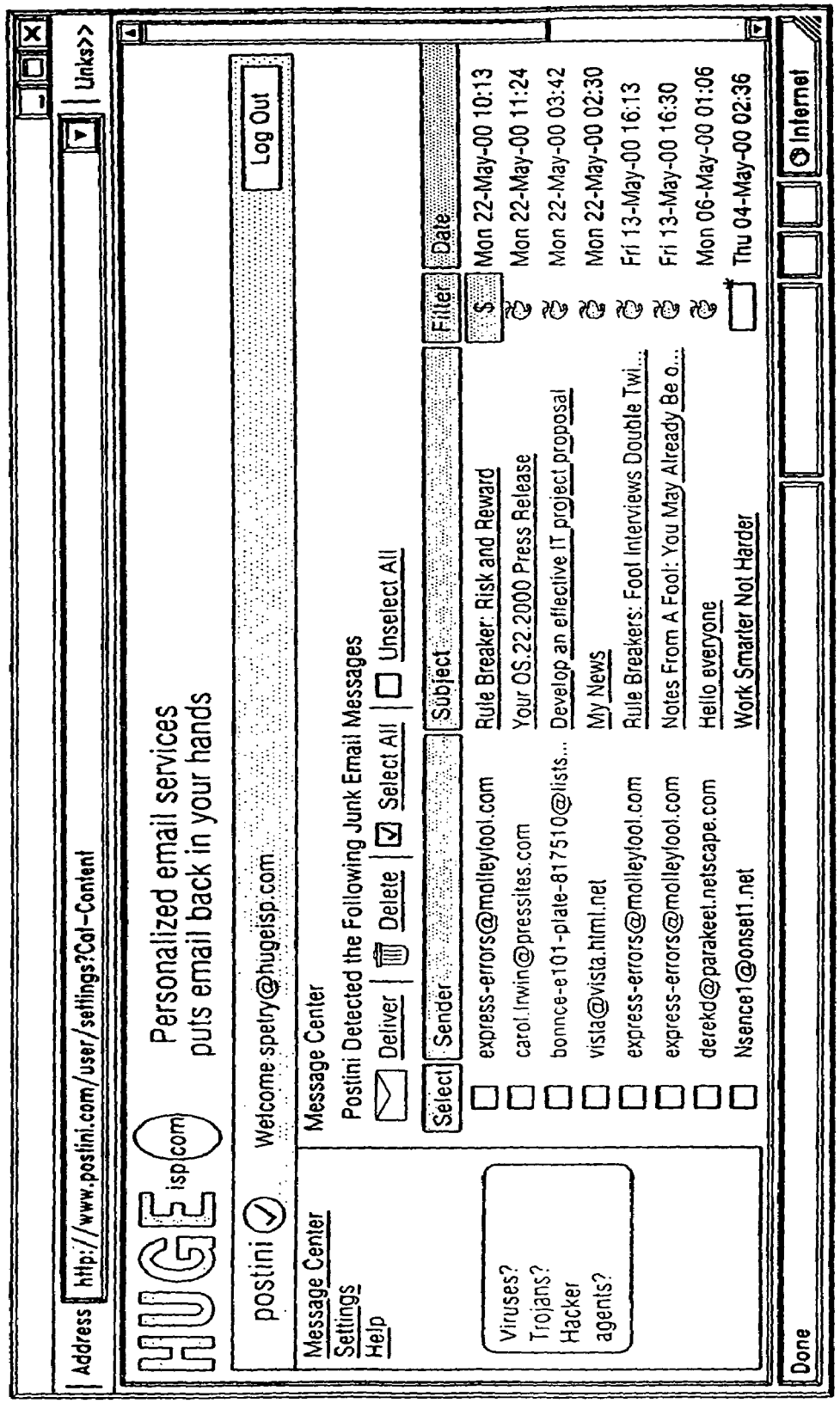

FIG. 6 shows an example of a web form screen display that may be filled out by the user to configure message delivery for that user and subsequently modified to modify the configuration. In the example shown, a subsequent screen display is shown after one of the mail filter items is selected.

In accordance with a further feature of the invention, devices may be provided with a background software routine that periodically notifies the messaging system, automatically, of the time of last user input to the device. This information may be used to dynamically route messages to increase the likelihood of early receipt by the user. For example, a user may specify messages to normally be delivered to the user's cellphone between the hours of 8-9 AM, 12-1 PM and 6-7 PM, and to the user's work between the hours of 9-12 AM and 1-6 PM, in accordance with the user's normal routine. On a particular afternoon, however, the user may be away from the office and may have used his/or her cellphone to receive or make one or more calls, or to access information, etc. If the user has selected a "find me" configuration option, then this usage information may be used to intelligently route messages to the user's cellphone, for example.

The value-added electronic messaging system detailed in the foregoing description provides an elegant solution to the multiple e-mail box conundrum. User-centric in design, the system is end-user configurable and uses an intuitive web metaphor. Based on a scalable architecture, the system works with existing e-mail accounts and does not require hardware or software integration.

Figure 7:
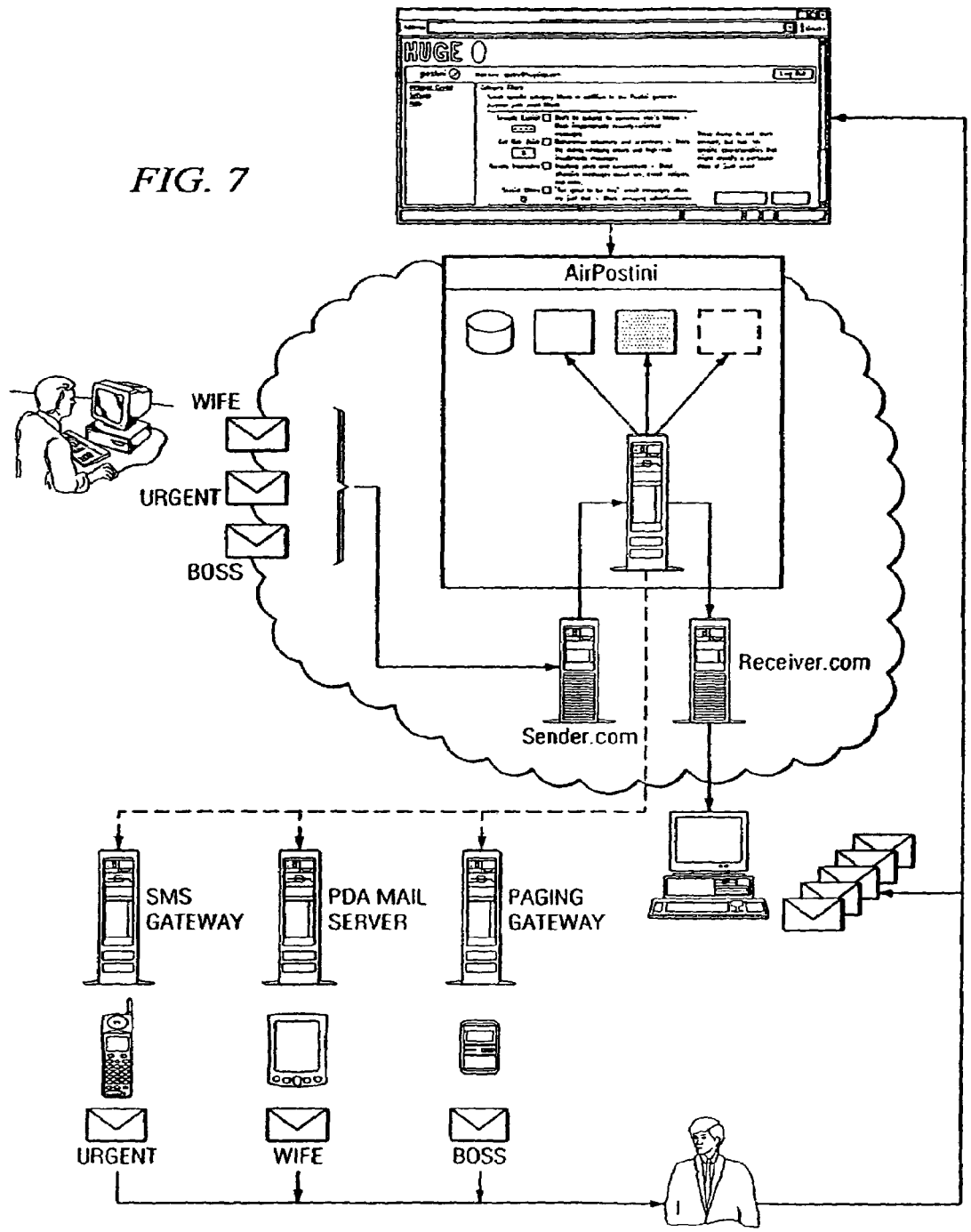
FIG. 7 is a diagram emphasizing end user configuration and mail processing.

FIG. 7 is a diagram of one embodiment of the system of the present invention emphasizing end user configuration and mail processing.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An electronic message management system for use in an e-mail network comprising a sending mail server and a destination mail server, wherein electronic messages may be transmitted from the sending mail server to the destination mail server via an electronic message delivery path, the system comprising:
   a message storage configured to store an electronic message filtered from reaching the destination mail server; and
   a webpage accessible by an end-user via a computer network and configured to display information representing at least a portion of the filtered electronic message to the end-user, wherein the end-user is an addressee of the filtered electronic message.

2. A system according to claim 1, wherein the information comprises a summary of the filtered message displayed to the end-user and selectable by the end-user to display the entire filtered message to the user via the website.

3. A system according to claim 1, wherein the information comprises at least one selected from the group consisting of message body, message header, message attachment and message subject line.

4. A system according to claim 1, wherein the information displayed to the end-user is selectable by the end-user to download the stored message from the message storage such that it is delivered to the destination mail server.

5. A system according to claim 1, wherein the information displayed to the end-user is selectable by the end-user to download an attachment associated with the filtered message from the message storage such that it is delivered to the destination mail server.

6. A system according to claim 5, wherein the website is further configured to display a warning concerning the content of the attachment to the end-user before the delivery.

7. A system according to claim 1, wherein the website is further accessible by the end-user to create or edit an end-user profile having detection parameters governing the filtering of electronic messages.

8. A system according to claim 7, wherein the filtering is based on at least one selected from the group consisting of:
   content of the message;
   virus detected in the message;
   source data associated with the message;
   destination data associated with the message; and
   forwarding electronic message to an end-user-designated mail server.

9. A system according to claim 7, wherein the detection parameters are selected from the group consisting of:
   content filtering parameters;
   virus detection parameters;
   e-mail source filtering parameters; and
   e-mail destination filtering parameters.

10. A system according to claim 1, further comprising an intermediate service configured to provide the filtering of the electronic message.

11. A system according to claim 10, wherein the intermediate service comprises an intermediate server configured to intercept the electronic message between the sending and destination mail servers to accomplish the filtering, and to send the filtered electronic message to the message storage.

12. A system according to claim 11, wherein the intermediate service is further configured to notify the end-user that the filtered electronic message has been stored in the message storage.

13. A system according to claim 12, wherein the intermediate sewer is configured to notify the end-user by sending an electronic message including the information representing at least a portion of the filtered electronic message.

14. A method of providing electronic messaging service in an e-mail network comprising a sending mail server and a destination mail server, wherein electronic messages may be transmitted from the sending mail server to the destination mail server via an electronic message delivery path, the method comprising:
   filtering an electronic message to prevent it from reaching the destination mail server;
   storing the filtered electronic message; and
   displaying information representing at least a portion of the filtered electronic message to an end-user through a webpage accessible by the end-user via a computer network, wherein the end-user is an addressee of the filtered electronic message.

15. A method according to claim 14, wherein displaying information comprises displaying a summary of the filtered message to the end-user that is selectable by the end-user, and further comprising displaying the entire filtered message to the end-user in response to the selection by the end-user.

16. A method according to claim 14, wherein displaying information comprises displaying at least one selected from the group consisting of message body, message header, message attachment and message subject line.

17. A method according to claim 14, wherein the information displayed to the end-user is selectable by the end-user, the method further comprising delivering the stored message from the message storage to the destination mail server in response to the selection by the end-user.

18. A method according to claim 14, wherein the information displayed to the end-user is selectable by the end-user, the method further comprising delivering an attachment associated with the filtered message from the message storage to the destination mail server in response to the selection by the end-user.

19. A method according to claim 18, further comprising displaying a warning concerning the content of the attachment to the end-user before the delivering the attachment to the end-user.

20. A method according to claim 14, further comprising providing the end-user options to create or edit an end-user profile through the website, the end-user profile having detection parameters governing the filtering of electronic messages.

21. A method according to claim 20, wherein the filtering is based on at least one selected from the group consisting of:
   content of the message;
   virus detected in the message;
   source data associated with the message;
   destination data associated with the message; and
   forwarding electronic message to an end-user-designated mail server.

22. A method according to claim 20, wherein the detection parameters are selected from the group consisting of:
   content filtering parameters;
   virus detection parameters;
   e-mail source filtering parameters; and
   e-mail destination filtering parameters.

23. A method according to claim 14, further comprising notifying the end-user of the filtering and the storing.

24. A method according to claim 23, wherein the notifying comprises transmitting an electronic message to the destination mail server having the at least a portion of the filtered electronic message.

* * * * *